(12) United States Patent
Kono et al.

(10) Patent No.: US 8,701,623 B2
(45) Date of Patent: Apr. 22, 2014

(54) MULTI-LINK, ADJUSTABLE-STROKE TYPE ENGINE

(75) Inventors: Shohei Kono, Wako (JP); Kotaro Sugi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 304 days.

(21) Appl. No.: 13/402,092

(22) Filed: Feb. 22, 2012

(65) Prior Publication Data

US 2012/0210959 A1 Aug. 23, 2012

(30) Foreign Application Priority Data

Feb. 23, 2011 (JP) ................... 2011-037148

(51) Int. Cl.
*F16C 3/14* (2006.01)
*F01M 1/06* (2006.01)
*F01L 1/344* (2006.01)

(52) U.S. Cl.
CPC ........................................ *F16C 3/14* (2013.01)
USPC .................... 123/196 W; 123/78 F; 123/48 B; 123/196 R (58) Field of Classification Search
CPC .......... F01L 1/344; F01M 1/02; F02B 61/04; F02D 15/02; F02D 15/04; F16C 3/04; F16C 3/14
USPC ........... 123/196 R, 196 W, 90.15, 48 R, 48 B, 123/78 R, 78 A, 78 BA, 78 F; 184/1.5, 6.5, 184/6.19
See application file for complete search history.

(56) References Cited

U.S. PATENT DOCUMENTS

| 4,104,995 | A | * | 8/1978 | Steinbock | 123/78 D |
|---|---|---|---|---|---|
| 6,260,532 | B1 | * | 7/2001 | Mendler | 123/192.2 |
| 6,443,107 | B1 | * | 9/2002 | Mendler | 123/48 B |
| 6,814,034 | B2 | * | 11/2004 | Yamada et al. | 123/48 B |

FOREIGN PATENT DOCUMENTS

JP 2002-138867 5/2002

* cited by examiner

*Primary Examiner* — Noah Kamen
*Assistant Examiner* — Grant Moubry
(74) *Attorney, Agent, or Firm* — Rankin, Hill & Clark LLP (57) ABSTRACT

A multi-link, adjustable-stroke type engine includes: a timing gear provided on and concentrically with a crankshaft; an eccentric gear provided on an eccentric shaft and meshing with the timing gear so that rotation of the timing gear is transmitted to the eccentric gear; a lubricating oil passage provided in a cylinder barrel for supplying lubricating oil to lower shaft end portions of the crankshaft and eccentric shaft; and an ejection section provided in the lubricating oil passage for ejecting lubricating oil toward a meshing engagement section between the timing gear and the eccentric gear.

3 Claims, 8 Drawing Sheets

MULTI-LINK, ADJUSTABLE-STROKE TYPE ENGINE

FIELD OF THE INVENTION

The present invention relates to a multi-link, adjustable-stroke type engine including an eccentric shaft provided in a crankcase for changing an intake stroke and compression stroke of a piston.

BACKGROUND OF THE INVENTION

Generally, the conventionally-known multi-link, adjustable-stroke type engines which include: a plurality of links mechanically interconnecting a piston pin and a crank pin of a crankshaft; a control shaft having an eccentric cam provided thereon; a control link connected at one end to one of the plurality of links and connected at the other end to the eccentric cam; a reciprocating member connected at its distal end portion to the control link; a rotating member meshing with a proximal end portion of the reciprocating member via a screw section; a hydraulic pressure chamber facing the proximal axial end surface of the reciprocating member, and in which strokes of the piston are changeable by the rotating member being driven to rotate about the axis of the reciprocating member.

One example of such conventionally-known multi-link, adjustable-stroke type engines is disclosed in Japanese Patent Application Laid-Open Publication No. 2002-138867 (hereinafter referred to as "relevant patent literature"), which is constructed to pre-press the reciprocating member in the same direction as a load acting on the reciprocating member at the time of descending movement of the piston, so that a reciprocating load acting on the reciprocating member can be reliably prevented from undesirably inverting from a main direction (i.e., direction in which the load acts on the reciprocating member on the basis of a combustion or compression pressure applied to the piston) to an opposite direction.

In the commonly-known reciprocating type internal combustion engines, combustion pressure applied to the piston is transmitted to a single crankshaft via a con rod and output as rotational force from the single crankshaft; thus, normally, the piston combustion pressure acts on only one output shaft.

By contrast, the multi-link, adjustable-stroke type engine disclosed in relevant patent literature includes the plurality of links for controlling the position of the piston. Thus, in a case where a pivot point of one of the plurality of links is connected to an eccentric shaft, combustion pressure applied to the piston is transmitted, via the connected link, to both the crankshaft, which is an output shaft, and the eccentric shaft.

Further, in a case where the eccentric shaft and the crankshaft are interconnected via gears to synchronize rotations of the eccentric shaft and the crankshaft, rotational force caused by combustion pressure acting on the two shafts and by inertia force of motion parts would differ in a very complicated manner depending on an engine load and the number of rotations of the engine. Thus, driving/driven relationship between the gears would also change or switch several times per cycle.

Namely, by torque switching in response to which the driving/driven relationship between the gears switches, gear rattling noise is generated due to the backlash of the gears, so that engine noise would undesirably increase. As a means for suppressing such gear rattling noise caused by the torque switching, there has been known a "no-backlash gear" (scissor gear) mechanism in which two superposed gears are resiliently displaced from each other in their rotational direction via a spring so that the gear backlash can be eliminated. With the "no-backlash gear" mechanism, the spring load has to be great enough to appropriately endure torque inversion at the time of the torque switching; however, such a great spring load would unavoidably lead to increased friction sound etc.

SUMMARY OF THE INVENTION

In view of the foregoing prior art problems, it is an object of the present invention to provide an improved multi-link, adjustable-stroke type engine which can significantly reduce gear meshing noise, i.e. sound noise due to gear meshing caused by driving torque between a crankshaft and an eccentric shaft and reduce gear rattling noise generated by torque inversion.

In order to accomplish the above-mentioned object, the present invention provides an improved multi-link, adjustable-stroke type engine including: a cylinder barrel having formed therein a cylinder for reciprocatively guiding a piston, and a crankcase rotatably supporting a crankshaft; a cylinder head closing a cylinder-side opening of the cylinder barrel from a lateral side thereof; an oil pan provided in a lower region of the cylinder barrel; and an eccentric shaft provided in the crankcase for changing an intake stroke and compression stroke of the piston, which comprises: a timing gear provided on and concentrically with the crankshaft; a cam gear shaft provided in the crankcase and having cams for driving an intake valve and an exhaust valve, respectively; and an eccentric gear provided on the eccentric shaft and meshing with the timing gear so that rotation of the timing gear is transmitted to the eccentric gear, which comprises: a lubricating oil passage provided in the cylinder barrel for supplying lubricating oil to a shaft end portion of the crankshaft and a shaft end portion of the eccentric shaft; and an ejection section provided in the lubricating oil passage for ejecting lubricating oil toward a meshing engagement section between the timing gear and the eccentric gear.

By the provision of the lubricating oil passage for supplying lubricating oil to the shaft end portion of the crankshaft and the shaft end portion of the eccentric shaft and the provision of the ejection section provided in the lubricating oil passage for ejecting lubricating oil toward the meshing engagement section between the timing gear and the eccentric gear, the present invention can constantly eject the lubricating oil axially to the meshing engagement section (meshing engagement point) between the timing gear, interconnecting the crankshaft and the eccentric shaft, and the eccentric gear, to thereby permit positive formation of a lubricating oil film on the meshing engagement section.

Namely, an oil damper function is provided by the formation of a lubricating oil film on the meshing engagement section (point) between the timing gear and the eccentric gear, which can effectively reduce gear meshing noise, i.e. sound due to gear meshing caused by driving torque between the crankshaft and the eccentric shaft and reduce rattling noise generated by inversion of the torque.

Preferably, in the multi-link, adjustable-stroke type engine of the present invention, the cylinder barrel includes an oil pump provided therein adjacent to the lower surface of the cylinder barrel and connected to a lower end portion of a cam gear shaft to be driven by the cam gear shaft, the cam gear shaft being provided in the crankcase and having cams for driving an intake valve and an exhaust valve, respectively, and the lubricating oil passage is provided in the cylinder barrel adjacent to the lower surface of the cylinder barrel. Thus, high-pressure lubricating oil can be supplied to the meshing engagement section between the timing gear and the eccentric gear, as a result of which a sufficient lubricating oil film can always be formed on the meshing engagement section between the timing gear and the eccentric gear.

Preferably, in the multi-link, adjustable-stroke type engine of the present invention, the ejection section ejects the lubricating oil vertically upwardly toward the meshing engagement section. Thus, sufficient lubricating oil can always be fed to and maintained in the meshing engagement section, as a result of which the present invention can even further reduce sound noise in the meshing engagement section.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE INVENTION

First Embodiment

As shown in FIGS. 1 to 5, a first embodiment of an engine 10 of the present invention is an air-cooling type single-cylinder engine for use, for example, in working machines. More specifically, the engine 10 is a vertical, multi-link, adjustable-stroke type engine in which the axis line 12a of a crankshaft 12 is oriented or extending in a substantially vertical direction and in which intake and compression strokes of a piston 13 are adjustable. For convenience of description, the engine 10 will hereinafter sometimes be referred to also as "vertical engine 10", "multi-link, adjustable-stroke type engine 10" or "vertical, multi-link, adjustable-stroke type engine 10".

The engine 10 includes an outer envelope comprising: a cylinder barrel (or engine block) 16 having formed therein a cylinder or cylinder block 14 for reciprocatively guiding the piston 13, and a crankcase 15 for rotatably supporting a crankshaft 12; a cylinder head 17 closing a cylinder-side opening 18 of the cylinder barrel 16 from a lateral side of the cylinder barrel 16; and an oil pan 21 provided in a lower region of the crankcase 15.

The crankcase 15 includes a case body 28 formed integrally with the cylinder block 14 by casting, and a case lid 29 interposed between a crankcase-side opening portion 19 of the case body 28 and the oil pan 21. The crankcase 15 rotatably supports the crankshaft 12 that integrally has a pair of counterweights 22 and a crankpin 23 interconnecting the counterweighs 22.

The case body 28 and the case lid 29 together constitute a crank chamber 24. The cylinder barrel (engine block) 16 is defined by the cylinder block 14 and the body 28 and lid 29 of the crankcase 15. The oil pan 21 is mounted to the case body 28 via the case lid 29, and lubricating oil for circulation through the interior of the engine 10 is stored in the oil pan 21. The engine 10 also includes a later-described lubrication device 90 best seen in FIG. 4.

The crankshaft 12 has an upper end (i.e., one end) portion 12b extending through the crankcase 15 to project outwardly upward, and the crankshaft 12 is rotatably supported at its upper and lower end portion by upper and lower bearings 25 and 26, respectively, provided on the crankcase 15. An annular seal member 27 is fitted on the upper bearing 25 between the crankshaft 12 and an upper end portion of the case body 28.

The piston 13 is slidably fitted in a cylinder bore 31 formed in the cylinder block 14, and a combustion chamber 32 to which a top portion 13a of the piston 13 is exposed is formed between the cylinder block 14 and the cylinder head 17.

The cylinder head 17 has an air intake port 33 and an exhaust port 34 formed therein for communication with the combustion chamber 32, an air intake valve 35 for opening and closing communication between the air intake port 33 and the combustion chamber 32, and an exhaust valve 36 for opening and closing communication between the exhaust port 34 and the combustion chamber 32. Further, the cylinder head 17 includes an ignition plug 39 for igniting an air-fuel mixture, and a tappet chamber (valve chamber) 43 is provided within the cylinder head 17.

The air intake valve 35 and the exhaust valve 36 are normally biased, by corresponding valve springs 37 and 38, in a valve closing direction. Further, the air intake valve 35 and the exhaust valve 36 have valve stems 41 and 42, respectively, that are slidable along the cylinder head 17, and lubricating oil is supplied to respective distal end portions (stem end portions) 41a and 42a of the valve stems 41 and 42.

Figure 1:
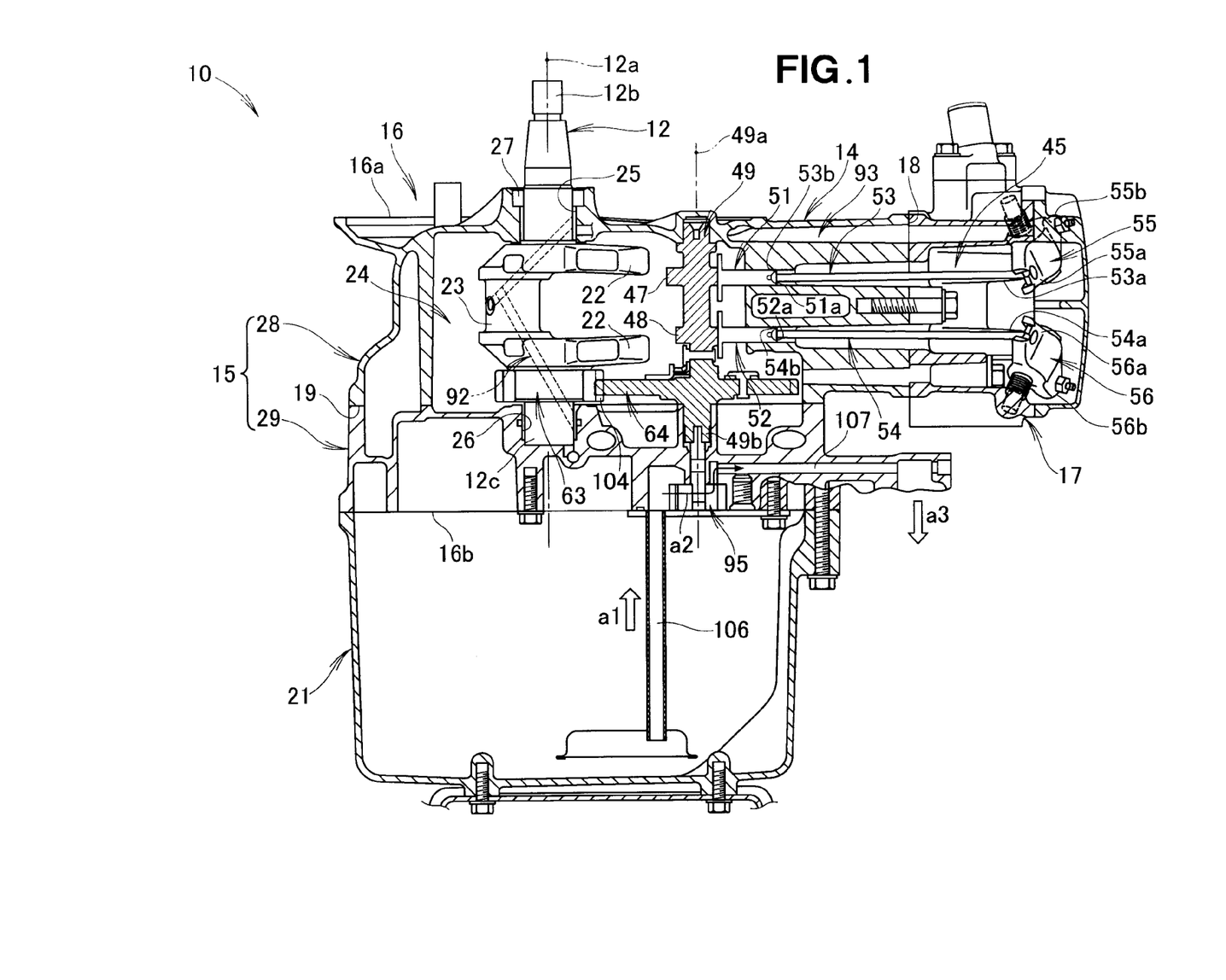
FIG. 1 is a sectional front view showing a vertical engine according to a first embodiment of the present invention.

A valve operating mechanism 45 for opening and closing the air intake valve 35 and exhaust valve 36 includes: a cam gear shaft (or cam shaft) 49 that has an intake cam 47 and an exhaust cam 48 provided thereon and that is rotatably supported by the crankcase 15; an intake tappet 51 supported by the cylinder block 14 in such a manner that it slides in a left-right direction of FIG. 1 by being driven via the intake cam 47; an exhaust tappet 52 supported by the cylinder block 14 in such a manner that it slides in the left-right direction by being driven via the exhaust cam 48; an intake push rod 53 extending in the left-right direction with its end portion 53b connected to an end portion 51a of the intake tappet 51; an exhaust push rod 54 extending in the left-right direction with its one end portion 54b connected to an end portion 52a of the exhaust tappet 52; an intake rocker arm 55 pivotably supported by the cylinder head 17 for opening and closing the air intake valve 35; and an exhaust rocker arm 56 pivotably supported by the cylinder head 17 for opening and closing the exhaust valve 36.

The intake rocker arm 55 has one end portion 55a abutted against an upper end portion 53a of the intake push rod 53, the exhaust rocker arm 56 has one end portion 56a abutted against an upper end portion 54a of the exhaust push rod 54, and the intake rocker arm 55 and the exhaust rocker arm 56 have their respective other end portions 55b and 56b abutted against the stem end portions (head portions) 41a and 42a, respectively, of the air intake valve 35 and exhaust valve 36.

Further, the intake rocker arm 55 and the exhaust rocker arm 56 each have a recess 57 or 58 formed therein for allowing lubricating oil to drip down to the stem end portion 41a or 42a of the corresponding intake or exhaust valve 35 or 36.

The cam gear shaft (cam shaft) 49 has an axis line 49a extending parallel to the crankshaft 12. A first drive section 61 for transmitting rotational power from the crankshaft 12 to the cam gear shaft 49 with a reduction ratio of 1/2 is provided between the cam gear shaft 49 and the crankshaft 12.

The first drive section 61 includes a timing gear (drive gear) 63 fixed to the crankshaft 12, and a cam gear (first driven gear) 64 provided on the cam gear shaft 49. The timing gear 63 and the cam gear 64 are each a helical gear.

Further, an oil pump 95, which is a component part of the lubrication device 90 for circulating lubricating oil of the oil pan 1 through the interior of the engine 10, is connected to a lower end portion 49b of the cam gear shaft (cam shaft) 49.

An eccentric shaft (rotation shaft) 66 having an axis line 66a extending parallel to the crankshaft 12 is rotatably supported at its opposite end portions (upper and lower end portions) 66b and 66c rotatably supported by the crankshaft 15. A second drive section 62 for transmitting rotational power from the crankshaft 12 to the eccentric shaft 66 with a reduction ratio of 1/2 is provided between the eccentric shaft 66 and the crankshaft 12. The second drive section 62 includes the timing gear 63 of the crankshaft 12, and an eccentric gear (second driven gear) 65 provided on the eccentric shaft 66 in meshing engagement with the timing gear 63. The eccentric gear 65 is also a helical gear.

An eccentric shaft 67 having an axis line 67a eccentrically offset from the axis line 66a of the eccentric shaft 66 is provided integrally on the eccentric shaft 66. Further, the eccentric shaft 67, piston 13 and crankshaft 12 are interconnected via a link mechanism 68.

The link mechanism 68 includes: a main con rod 72 connected at one end portion 72a to the piston 13 via a piston pin 71; a sub con rod 73 disposed between the counterweights 22 of the crankshaft 12, connected to the crankpin 23 and pivotably connected to another other end portion 72b of the main con rod 72; and a swing rod 74 pivotably connected at one end portion 74a to the sub con rod 73 at a position offset from a connection position of the a main con rod 72 and connected at another end portion 74a to the eccentric shaft 67.

The sub con rod 73 is formed to slidably contact a semi-peripheral surface of the crank pin 23, and a crank cap 75 slidably contacting the remaining semi-peripheral surface of the crank pin 23 is fastened to the sub con rod 73 by means of a pair of bolts 76.

The main con rod 72 is pivotably connected at the other end portion 72b to one end portion 73a of the sub con rod 73 via a con rod pin 77. The swing rod 74 is pivotably connected at one end portion 74a to another end portion 73b of the sub con rod 73 via a swing pin 78, and a circular connection hole 79 is formed through another end portion 74b of the swing rod 74 so that the eccentric shaft 67 extends through the hole 79 for pivotal movement relative to the other end portion 74b.

Namely, in response to rotation of the crankshaft 12, the eccentric shaft 66 is driven to rotate with the reduction rate of 1/2. Then, in response to rotation of the eccentric shaft 67 about the axis line 66a of the eccentric shaft 66, the link mechanism 68 operates to make an expansion stroke of the piston 13 greater than the compression stroke of the piston 13 and thereby permits greater expansion work with the same amount of intake air-fuel mixture. As a result, the instant embodiment can achieve an enhanced cyclic thermal efficiency.

The lubrication device 90 employed in the first embodiment of the vertical engine 10 includes: the oil pump 95 provided in the cylinder barrel adjacent to the lower surface (i.e., lower surface in the substantially vertical direction) 16b of the cylinder barrel 16 and connected to a lower end portion 49b of the cam gear shaft 49 to be driven by the cam gear shaft 49; an oil filter disposed downstream of the oil pump 95 for removing foreign substances contained in lubricating oil; a first lubricating oil passageway 91 for supplying lubricating oil, sent out from the oil pump 95, to the lower bearing 26 of the crankshaft 12; a second lubricating oil passageway 92 extending through the interior of the crankshaft 12 from the lower bearing 26 to the upper bearing 25; a third lubricating oil passageway 93 provided in the cylinder barrel 16 adjacent to the upper surface (i.e., upper surface in the substantially vertical direction) 16a of the cylinder barrel 16 and extending from the crankcase 15 to immediately below the stem end portions 41a and 42a of the air intake valve 35 and exhaust valve 36 so that lubricating oil leaked from the second lubricating oil passageway 92 flows therethrough; and a fourth lubricating oil passageway 94 for returning lubricating oil, dripped down from the third lubricating oil passageway 93 to the stem end portions 41a and 42a of the air intake valve 35 and exhaust valve 36, to the oil pan 21 and hence to the oil pump 95. The lubrication device 90 also includes: a gear lubricating oil passageway 97 provided at the distal end of the first lubricating oil passageway 91; an ejection section 103 provided at the distal end of the gear lubricating oil passageway 97 for ejecting lubricating oil toward a meshing engagement section 104 between the timing gear 63 and the eccentric gear 65; a shaft-end lubricating oil passageway 98 connected to the gear lubricating oil passageway 97 for supplying lubricating oil to a shaft end portion (lower shaft end portion) of the eccentric shaft 66; and a shaft lubricating oil passageway 99 extending through the eccentric shaft 66 from the lower shaft end portion 66c to the upper shaft end portion 66b.

The first lubricating oil passageway 91, gear lubricating oil passageway 97 and shaft-end lubricating oil passageway 98 together constitute a lubricating oil passage 102 for supplying lubricating oil to a lower shaft end portion 12c of the crankshaft 12 and the lower shaft end portion 66c of the eccentric shaft 66.

An oil supply passageway 106 is disposed upstream of the oil pump 95 for drawing up lubricating oil of the oil pan 21, and an oil delivery passageway 107 is disposed downstream of the oil pump 95 for delivering lubricating oil to the oil filter 96.

The first lubricating oil passageway 91 has a crank-side supply opening 91a for supplying lubricating oil to around the lower shaft end portion 12c of the crankshaft 12. The second lubricating oil passageway 92 has an oil input opening 92a through which lubricating oil is input to the lower shaft end portion 12c of the crankshaft 12, and an oil output opening 92b through which lubricating oil of the upper shaft end 12b is output.

The shaft-end lubricating oil passageway 98 has an eccentric-side supply opening 98a for supplying lubricating oil to the lower shaft end portion 66c. The shaft lubricating oil passageway 99 has an oil input opening 99a through which lubricating oil is input to the lower shaft end portion 66c of the eccentric shaft 66, and a shaft-end oil output opening 99b through which lubricating oil of the upper shaft end portion 66b of the eccentric shaft 66 is output.

Namely, in the lubrication device 90, lubricating oil of the oil pan 21 is drawn up to the oil pump 95 through the oil supply passageway 106 as indicated by arrow a1 in FIG. 1 and then flows from the oil pump 95 to the lubricating delivery passageway 107 as indicated by arrow a2, via which it is delivered to the oil filter 96 (FIG. 2) as indicated by arrow a3.

Figure 2:
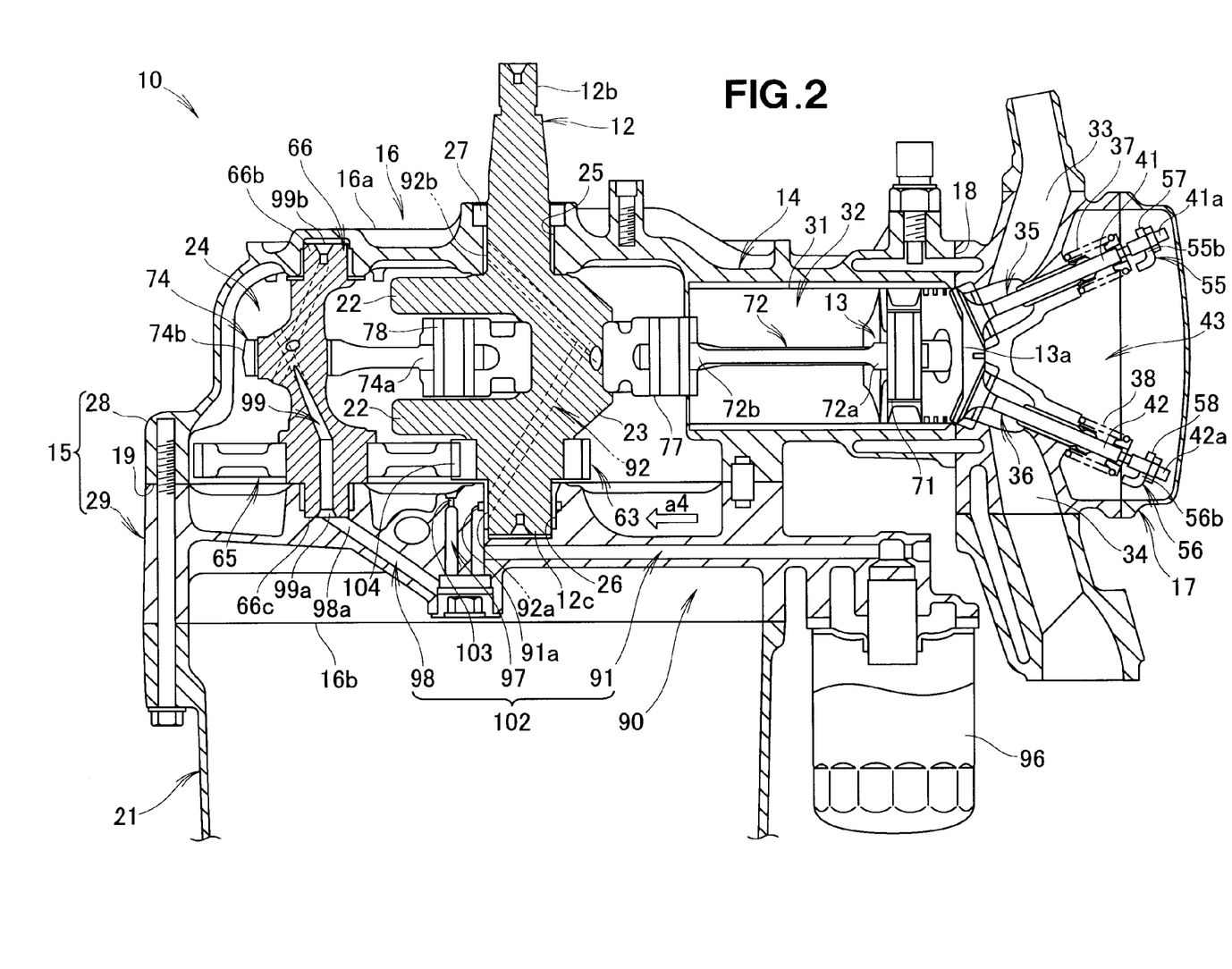
FIG. 2 is a sectional front view showing a cylinder of the vertical engine of FIG. 1.

Lubricating oil output from the oil filter 96 flows through the first lubricating oil passageway 91 as indicated arrow a4 in FIG. 2 and is delivered to the crank-side supply opening 91a of the first lubricating oil passageway 91. The lubricating oil, having been delivered to the crank-side supply opening 91a, is input to the second lubricating oil passageway 92 through the oil input opening 92a adjacent to the lower bearing 26. Then, the lubricating oil flows through the second lubricating oil passageway 92 as indicated by arrows a5 and a6 in FIG. 4 to be output via the oil output opening 92b to the upper bearing 25, then flows through the third lubricating oil passageway 93 as indicated by arrows a7 and a8 and then drips down from the third lubricating oil passageway 93 to the stem end portions 41a and 42a of the intake and exhaust valves 35 and 36 (see FIG. 2) as indicated by arrow a9 (see FIG. 5). The lubricating oil, having dripped down to the stem end portions 41a and 42a, flows through the fourth lubricating oil passageway 94 as indicated by arrow a10 in FIG. 4, so that it returns to the oil pan 21 by way of the interior of the cylinder block 14.

Figure 6:
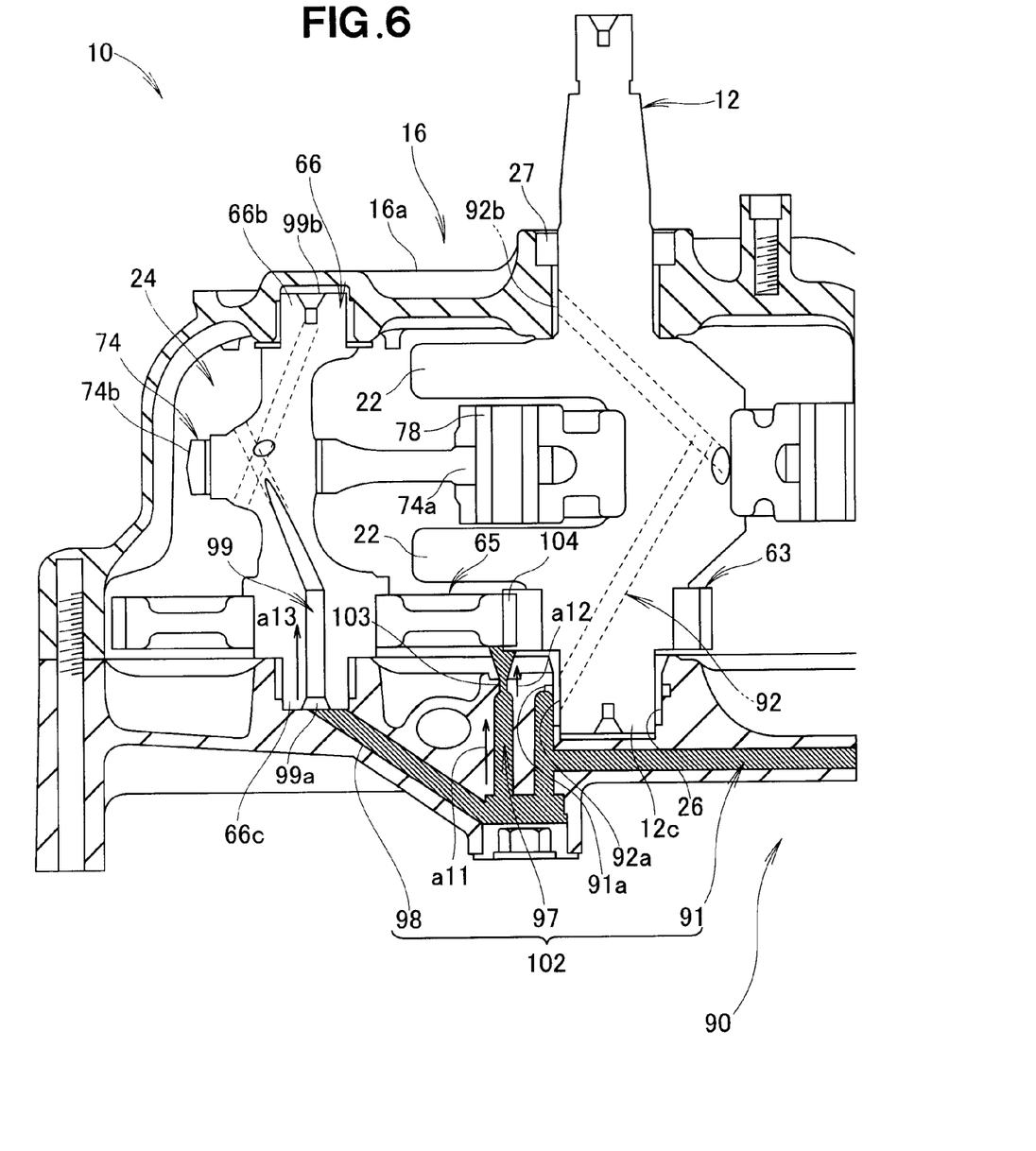
FIG. 6 is a sectional front view illustrating lubrication provided to a meshing engagement section between gears in the vertical engine of FIG. 4.

Meanwhile, an portion of the lubricating oil, having flown through the first lubricating oil passageway 91, flows into the gear lubricating oil passageway 97 as indicated by arrow a11 in FIG. 6 and is then ejected by the ejection section 103 toward the meshing engagement section 104 between the timing gear 63 and the eccentric gear 65 as indicated by arrow a12.

Further, the remaining portion of the lubricating oil, having flown through the first lubricating oil passageway 91, flows through the shaft-end lubricating oil passageway 98 and through the shaft lubricating oil passageway 99 as indicated by arrow a13 in FIG. 16 to lubricate the eccentric shaft 66.

The vertical engine 10, as set forth above in relation to FIGS. 1 to 5, includes: the cylinder barrel (engine block) 16 having formed therein the cylinder (cylinder block) 14 for reciprocatively guiding the piston 13 and the crankcase 15 for rotatably supporting the crankshaft 12 having the axis line 12a oriented or extending in the substantially vertical direction; the cylinder head 17 closing the cylinder-side opening 18 of the cylinder barrel 16 from a lateral side of the cylinder barrel 16; the oil pan 21 provided in a lower region of the cylinder barrel 16; the intake valve 35 and air intake port 33 provided on the cylinder head 17; and the cam gear shaft (cam shaft) 49 having the intake and exhaust cams 47 and 48 for driving the intake valve 35 and exhaust valve 36.

The vertical engine 10 also includes: the oil pump 95 connected to the lower end portion 49b of the cam gear shaft 49; the first lubricating oil passageway 91 for supplying lubricating oil, sent out from the oil pump 95, to the lower bearing 26 of the crankshaft 12; the second lubricating oil passageway 92 extending through the interior of the crankshaft 12 from the lower bearing 26 to the upper bearing 25; the third lubricating oil passageway 93 in the cylinder barrel 16 provided adjacent to the upper surface 16a of the cylinder barrel 16 and extending from the crankcase 15 to the stem end portions 41a and 42a of the air intake valve 35 and exhaust valve 36 so that lubricating oil leaked from the second lubricating oil passageway 92 flows therethrough; and the fourth lubricating oil passageway 94 for returning lubricating oil, dripped down from the third lubricating oil passageway 93 to the stem end portions 41a and 42a of the air intake valve 35 and exhaust valve 36, to the oil pump 95. With such arrangements, the lubricating oil compulsorily force-fed via the oil pump 95 is caused to flow through the crankshaft 12 from the lower bearing 26 to the upper bearing 25, and the lubricating oil leaked from the upper bearing 25 (i.e., leaked oil) is caused to drip down from the crankcase 15 to the stem end portions 41a and 42a of the air intake valve 35 and exhaust valve 36 so that the leaked oil is caused by drip down, by gravity, to the stem end portions 41a and 42 that are components parts to be lubricated (i.e., lubrication-requiring parts).

As set forth above, in the case where lubricating oil is pumped to lubrication-requiring parts by use of the oil pump 95, the capacity of the oil pump 95 has to be increased due to increase in the number, lengths, etc. of oil lubricating paths and increase in the number of component parts to be lubricated, which would undesirably lead to increase in pumping power loss of the oil pump 95. Further, in the case where gas flows, within the crankcase 15, by a breather are used, it is necessary to meet both of the conflicting requirements of directing an amount of oil necessary for lubrication and of minimizing oil in discharged gas from the breather from the perspective of efficient oil consumption, which would however be very difficult in view of a layout of various component parts of the engine 10. Furthermore, in the case where a phase difference in inner pressure variation is produced between the crankcase 15 and the cylinder head 17 (tappet chamber 43), an amount of lubricating oil in the tappet chamber 43 too may fluctuate depending on operating condition of the engine because the inner pressure variation tends to fluctuate due to complicated factors, such as an amount of lubricating oil within the crankcase 15, an amount of blow-by gas and the number of rotations of the engine.

To address such inconveniences, the instant embodiment of the vertical engine 10 includes: the first lubricating oil passageway 91 for supplying lubricating oil, sent out from the oil pump 95, to the lower bearing 26 of the crankshaft 12; the second lubricating oil passageway 92 extending through the interior of the crankshaft 12 from the lower bearing 26 to the upper bearing 25; the third lubricating oil passageway 93 provided in the cylinder barrel 16 adjacent to the upper surface 16a of the cylinder barrel 16 and extending from the crankcase 15 to immediately below the stem end portions 41a and 42a of the air intake valve 35 and exhaust valve 36 so that lubricating oil leaked from the second lubricating oil passageway 92 flows therethrough; and the fourth lubricating oil passageway 94 for returning lubricating oil, dripped from the third lubricating oil passageway 93 down to the stem end portions 41a and 42a of the air intake valve 35 and exhaust valve 36, to the oil pump 95. With such arrangements, the instant embodiment can reliably direct lubricating oil to the cylinder head 17 (tappet chamber 43) without requiring increase in the capacity of the oil pump 95 and without involving increase in the pumping power loss of the oil pump 95. Further, because gas flows by the breather are not used in the instant embodiment, the breather can be provided in a suitable place where the smallest amount of oil mist exists, and thus, the instant embodiment can minimize an amount of oil in the breather discharge. Besides, because a phase difference in internal pressure variation between the crankcase 15 and the cylinder head 17 is not used in the instant embodiment, the instant embodiment can reliably direct a necessary amount of lubricating oil to the cylinder head 17 (tappet chamber 43) without being influenced by operating condition of the engine etc.

Figure 3:
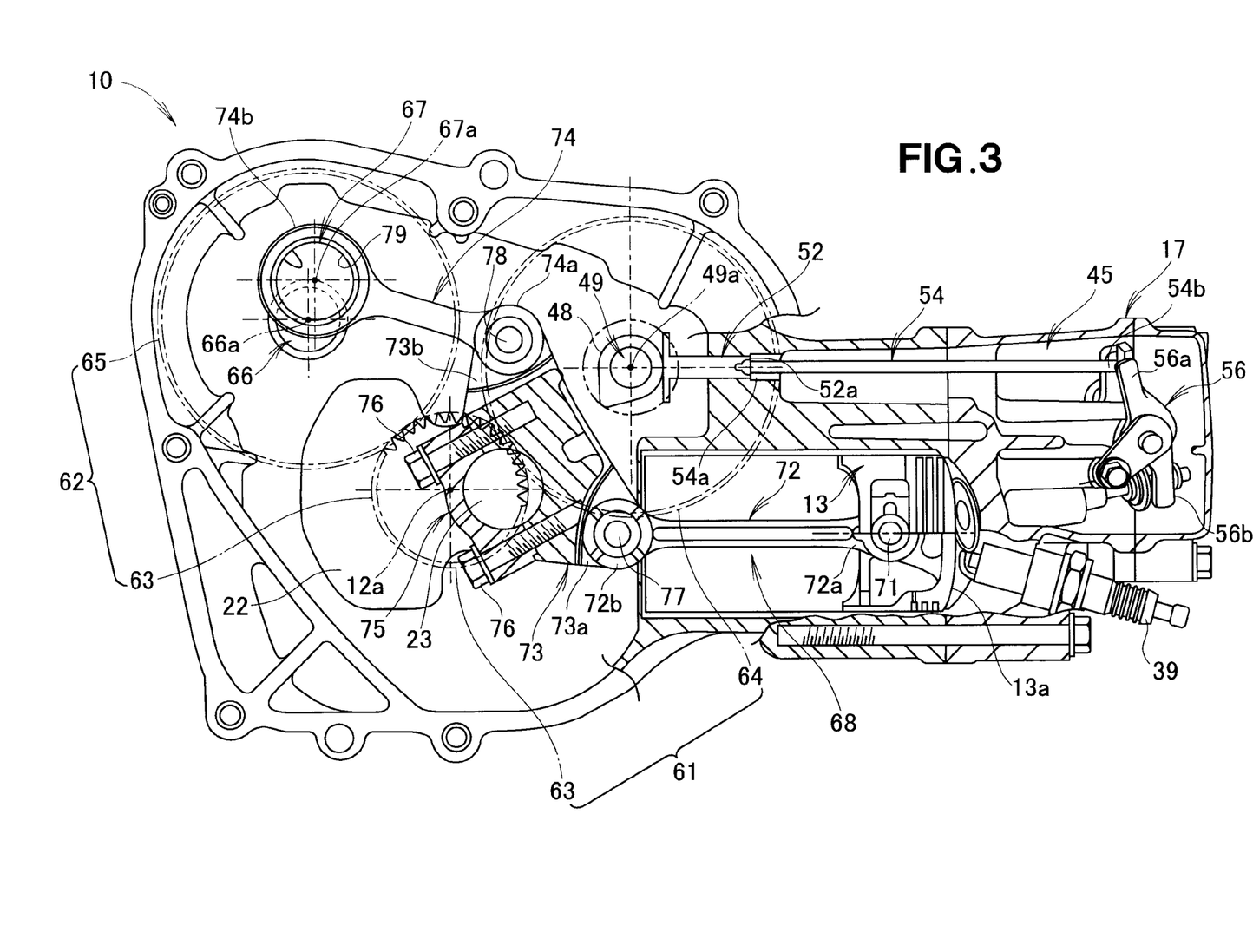
FIG. 3 is a sectional bottom view showing the vertical engine of FIG. 1.
Figure 4:
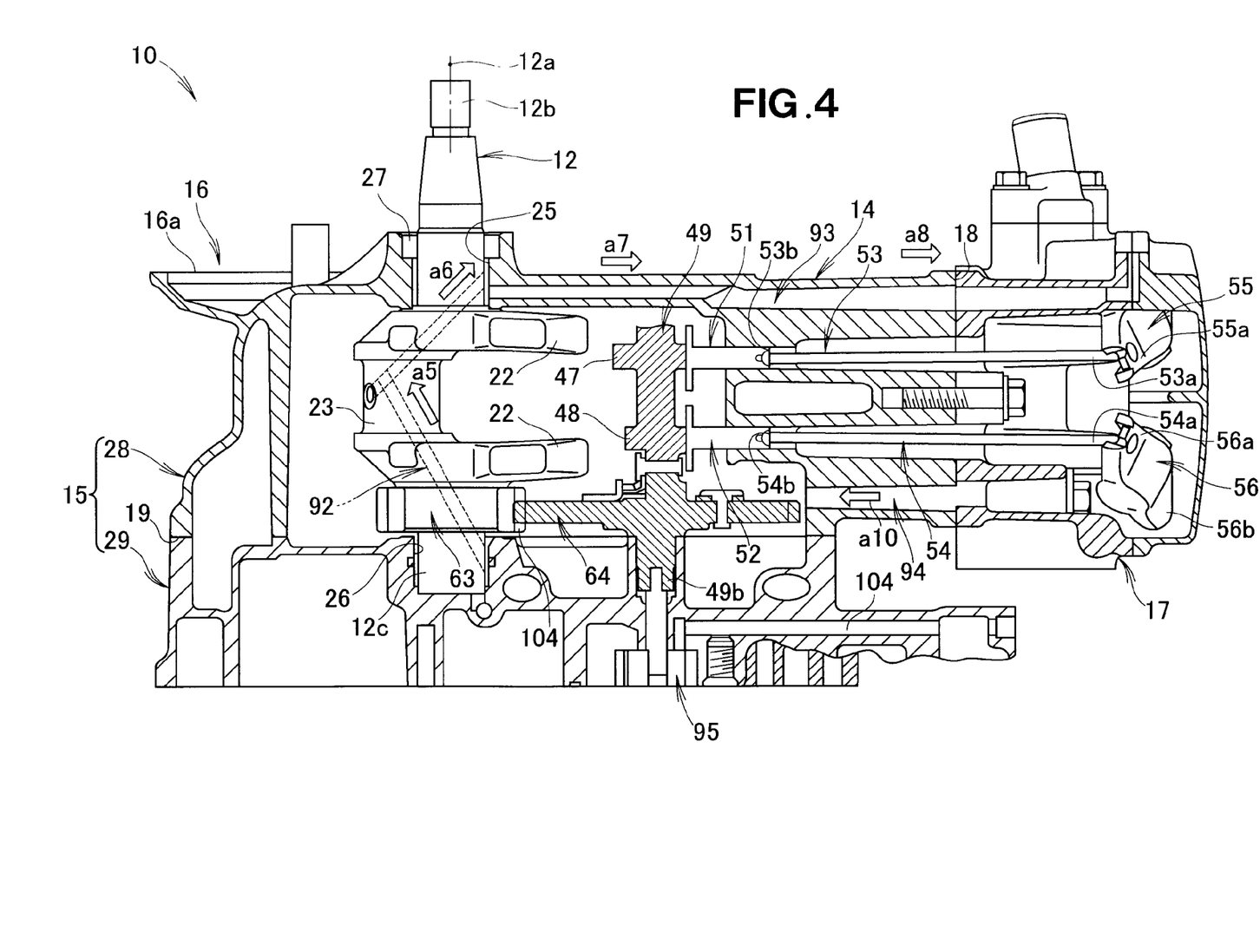
FIG. 4 is a sectional front view showing a lubrication device employed in the vertical engine of FIG. 1.
Figure 5:
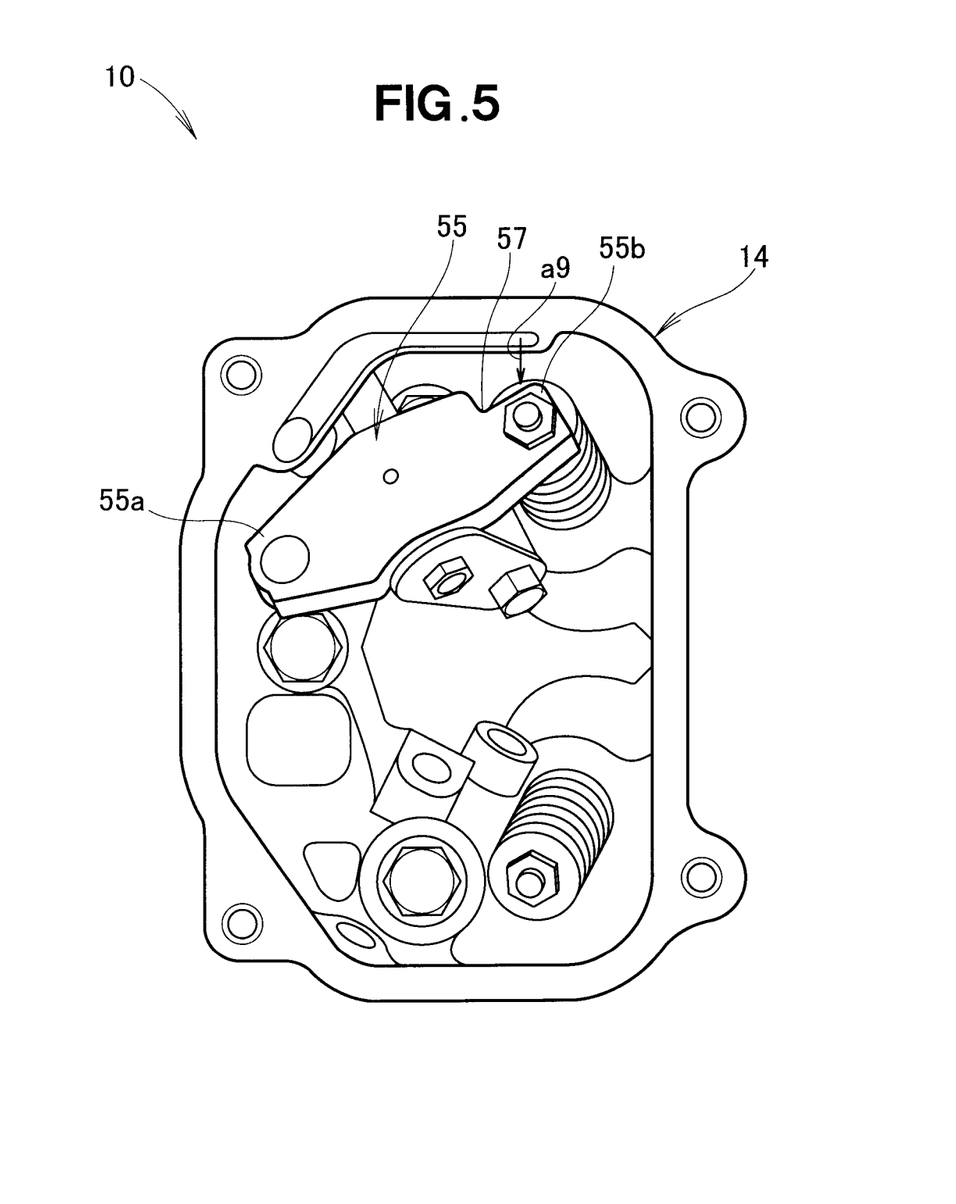
FIG. 5 is a side view showing a tappet chamber of the vertical engine of FIG. 4.

In the vertical engine 10, the intake and exhaust valves 35 and 36 are overhead valves provided on the cylinder head 17 as best seen in FIG. 3, and thus, generally, the intake and exhaust valves 35 and 36 are opened and closed via the intake and exhaust cams 47 and 48, intake and exhaust push rods 53 and 54 and intake and exhaust rocker arms 55 and 56.

Thus, in the instant embodiment, slight tappet clearances are provided between the rocker arms 55 and 56 and the intake and exhaust valves 35 and 36 because the rocker arms 55 and 56 of the push rods 53 and 54 change in volume due to thermal expansion as the engine 10 gets hot. When the engine 10 is cold in temperature, the tappet clearances would become a cause of noise. Namely, in the case where the intake and exhaust valves 35 and 36 are overhead valves provided on the cylinder head 17 as noted above, appropriate lubrication of the stem end portions 41a and 42a of the air intake valve 35 and exhaust valve 36 becomes a necessary condition, and such appropriate lubrication of the stem end portions 41a and 42a can achieve an enhanced quietness of the intake and exhaust valves 35 and 36.

Further, because the rocker arms 55 and 56, which allow motion of the intake and exhaust cams 47 and 48 to be transmitted to the intake and exhaust valves 35 and 36 via the push rods 53 and 54, have the recesses 57 and 58 for allowing lubricating oil to drip down to the stem end portions 41a and 42a of the intake and exhaust valves 35 and 36, the lubricating oil can be caused to drip down directly to the stem end portions 41a and 42a. Thus, the stem end portions 41a and 42a can be lubricated sufficiently, so that the instant embodiment of the engine 10 can significantly reduce sound noise in the intake and exhaust valves 35 and 36.

Furthermore, as seen from FIGS. 1 to 3 and 6, the instant embodiment of the engine 10 is a multi-link, adjustable-stroke type engine which includes, in addition to the aforementioned cylinder barrel 16 having the cylinder (cylinder block) 1 and crankshaft 12, cylinder head 17 and oil pan 21, the eccentric shaft (rotation shaft) 66 for adjusting the intake stroke and exhaust stroke of the piston 13, the timing gear 63 provided concentrically with the crankshaft 12, and the eccentric gear 65 meshing with the timing gear 63 so that rotation of the timing gear 63 is transmitted to the eccentric gear 65.

Because the cylinder barrel 16 includes: the lubricating oil passage 102 for supplying lubricating oil to the lower shaft end portion 12c of the crankshaft 12 and the lower shaft end portion 66c of the eccentric shaft 66; and the ejection section 103 provided in the lubricating oil passage 102 for ejecting lubricating oil toward the meshing engagement section 104 between the timing gear 63 and the eccentric gear 65, the instant embodiment can constantly eject lubricating oil axially to the meshing engagement section (meshing engagement point) 104 between the timing gear 63, interconnecting the crankshaft 12 and the eccentric shaft 66, and the eccentric gear 65, to thereby permit positive formation of a lubricating oil film on the meshing engagement section 104.

Namely, an oil damper function is provided by the formation of a lubricating oil film on the meshing engagement section (point) 104 between the timing gear 63 and the eccentric gear 65, which can effectively reduce meshing sound noise, i.e. sound noise due to gear meshing caused by driving torque between the crankshaft 12 and the eccentric shaft 66 and reduce gear rattling noise generated by inversion of the torque.

Furthermore, in the multi-link, adjustable-stroke type engine 10, as seen from FIGS. 1 to 3 and 6, the oil pump 95 is disposed adjacent to the lower surface 16b of the cylinder barrel 16 and connected to the lower end portion 49b of the cam gear shaft 49 to be driven by the cam gear shaft 49, and the lubricating oil passage 102 for supplying lubricating oil to the lower shaft end portion 12c of the crankshaft 12 and the lower shaft end portion 66c of the eccentric shaft 66 is disposed adjacent to the lower surface 16b of the cylinder barrel 16. With such arrangements, high-pressure lubricating oil can be supplied to the meshing engagement section 104 between the timing gear 63 and the eccentric gear 65, as a result of which a sufficient lubricating oil film can always be formed on the meshing engagement section 104 between the timing gear 63 and the eccentric gear 65.

Because the ejection section 103 in the multi-link, adjustable-stroke type engine 10 ejects lubricating oil to the meshing engagement section 104 in the substantially vertical direction from below, sufficient lubricating oil can always be fed to and maintained in the meshing engagement section 104, as a result of which the instant embodiment can even further reduce sound noise in the meshing engagement section 104.

Second Embodiment

Figure 7:
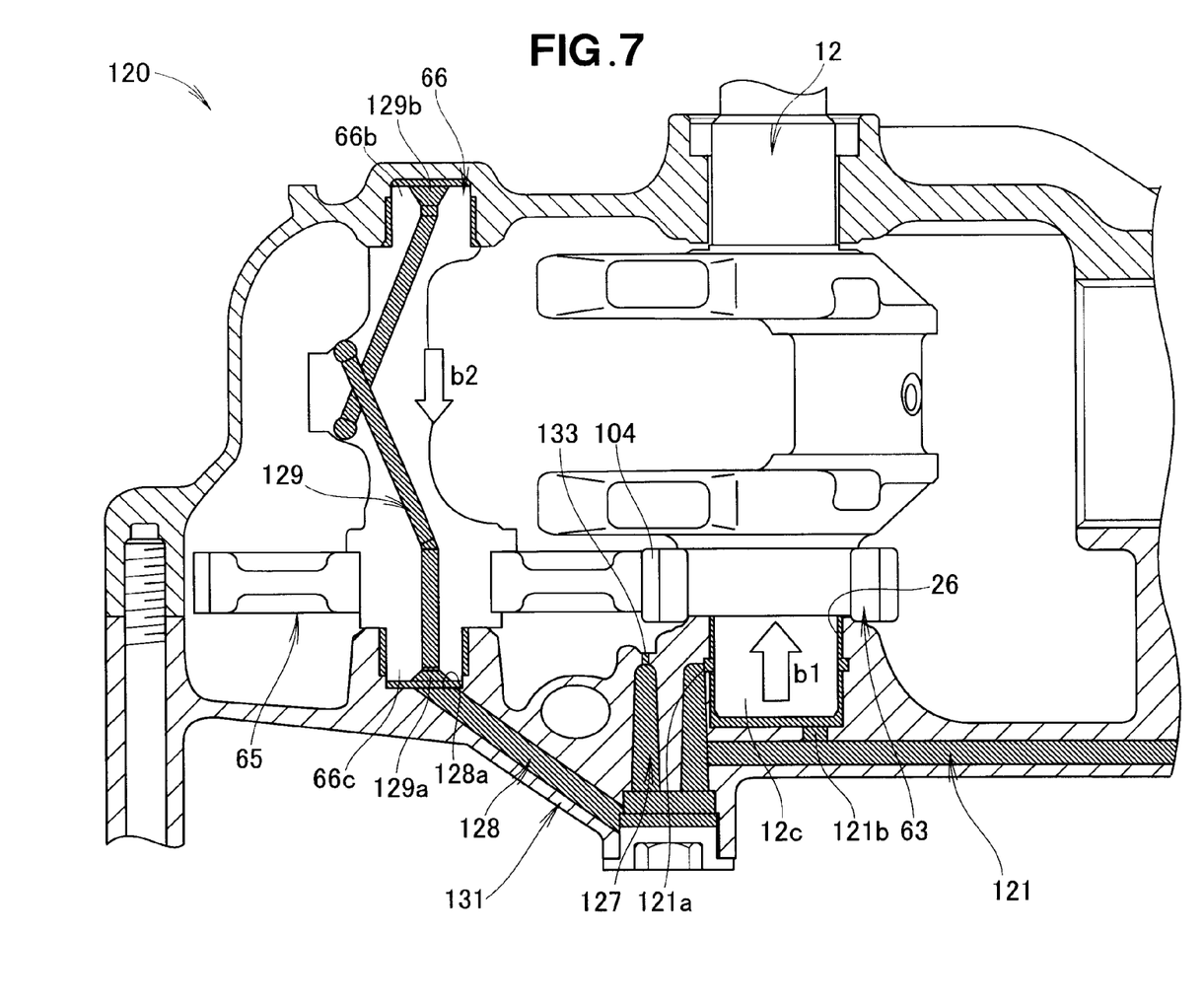
FIG. 7 is a sectional front view showing a vertical engine according to a second embodiment of the present invention, employing a modification of the lubrication device shown in FIG. 4.

FIG. 7 shows a second embodiment of the present invention provided with a lubrication device 120 that is a modification of the lubrication device 90 shown in FIGS. 1 to 6. The second embodiment is generally similar to the above-described first embodiment, except for the lubrication device 120. Namely, the lubrication device 120 in the second embodiment is different from the lubrication device 90 in the first embodiment in that a crank-side shaft-end supply opening 121b for supplying lubricating oil to the lower shaft end portion 12c of the crankshaft 12 is added to a first lubricating oil passageway 121 corresponding to the first lubricating oil passageway 91 of the above-described first embodiment.

Namely, the lubrication device 120 includes: a first lubricating oil passageway 121 for supplying lubricating oil to the lower bearing 26 of the crankshaft 12; a gear lubricating oil passageway 127 (corresponding to the gear lubricating oil passageway 97 of the above-described first embodiment) provided at the distal end of the first lubricating oil passageway 121; an ejection section 133 (corresponding to the ejection section 103 of the above-described first embodiment) provided at the distal end of the gear lubricating oil passageway 127 for ejecting lubricating oil toward the meshing engagement section 104 between the timing gear 63 and the eccentric gear 65; a shaft-end lubricating oil passageway 128 (corresponding to the shaft-end lubricating oil passageway 98 of the above-described first embodiment) connected to the gear lubricating oil passageway 127 for supplying lubricating oil to the lower shaft end portion 66c of the eccentric shaft 66; and a shaft lubricating oil passageway 129 (corresponding to the shaft lubricating oil passageway 99 of the above-described first embodiment) extending through the eccentric shaft 66 from the lower shaft end portion 66c to the upper shaft end portion 66b.

The first lubricating oil passageway 121, gear lubricating oil passageway 127, shaft-end lubricating oil passageway 128 and shaft lubricating oil passageway 129 together constitute a lubricating oil passage 131 for supplying lubricating oil toward the lower shaft end portion 12c of the crankshaft 12 and upper and lower shaft end portions 66b and 66c of the eccentric shaft 66 in such a manner as to pre-press the lower shaft end portion 12c and upper and lower shaft end portions 66b and 66c in predetermined directions.

The first lubricating oil passageway 121 has a crank-side supply opening 121a for supplying lubricating oil to around the lower shaft end portion 12c of the crankshaft 12, and the crank-side shaft-end supply opening 121b for supplying lubricating oil to the lower shaft end portion 12c of the crankshaft 12.

The shaft-end lubricating oil passageway 128 has an eccentric-side supply opening 128a for supplying lubricating oil to the lower shaft end portion 66c of the eccentric shaft 66. The shaft lubricating oil passageway 129 has an oil input opening 129a through which lubricating oil is input to the lower shaft end portion 66c of the eccentric shaft 66, and a shaft-end oil output opening 129b through which lubricating oil of the upper shaft end portion 66b of the eccentric shaft 66 is output.

The second embodiment of the multi-link, adjustable-stroke type engine 10, as explained above in relation to FIG. 3, includes the timing gear 63 provided concentrically with the crankshaft 12, and the eccentric gear 65 meshing with the timing gear 63 so that rotation of the timing gear 63 is transmitted to the eccentric gear 65. The timing gear 63 and eccentric gear 65 are each a helical gear.

In a case where a maximum upward axial load acts on the crankshaft 12 as indicated by arrow b1 in FIG. 7 and a maximum downward axial load acts on the eccentric shaft 66 as indicated by arrow b2 in FIG. 7, lubricating oil is supplied to the lower shaft end portion 12c of the crankshaft 12 to press the crankshaft 12 upwardly, and appropriate amounts of lubricating oil are supplied to the upper and lower shaft end portions 66b and 66c such that the loads acting on the eccentric shaft 66 are canceled out.

Third Embodiment

Figure 8:
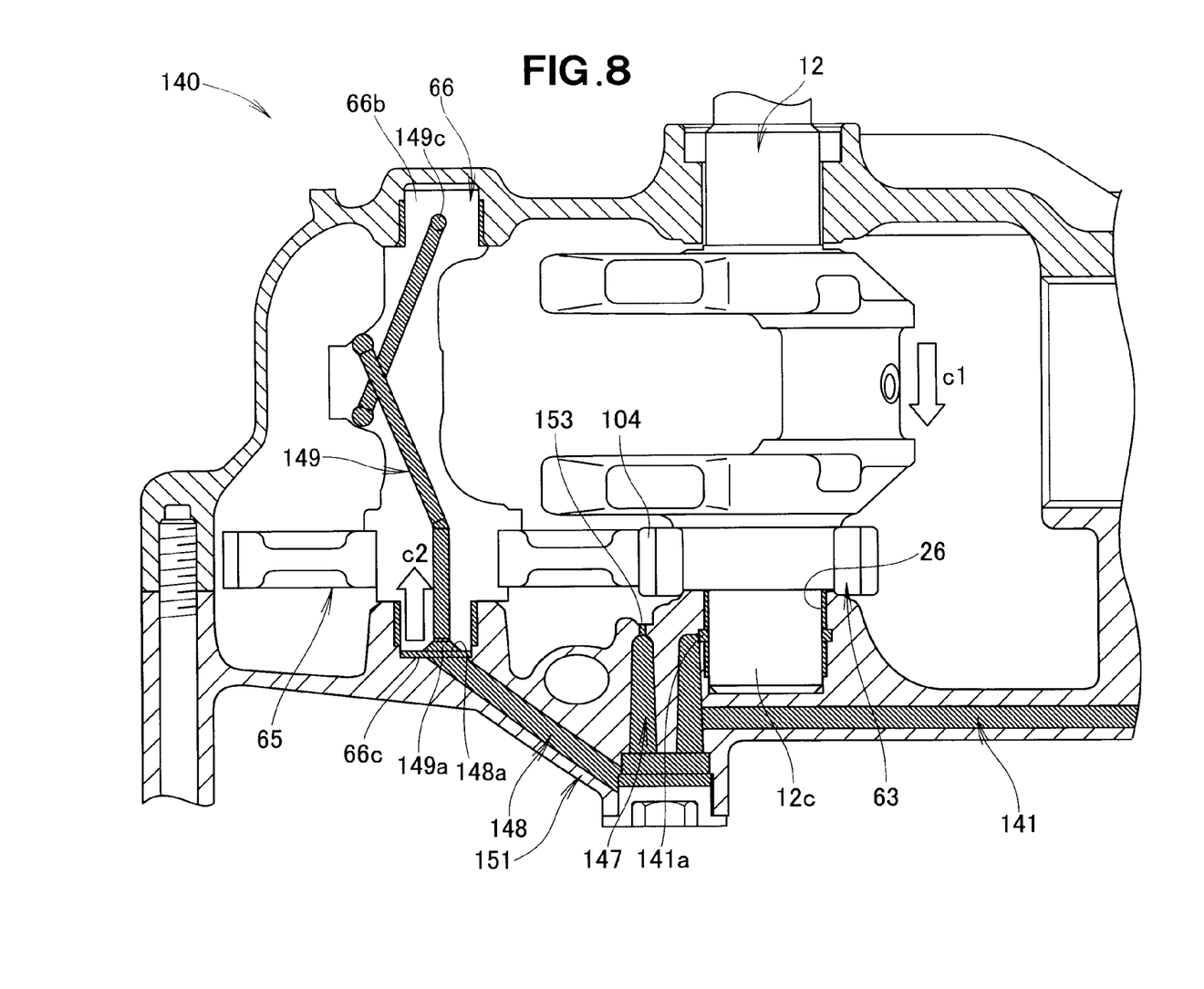
FIG. 8 is a sectional front view showing a vertical engine according to a third embodiment of the present invention, employing another modification of the lubrication device shown in FIG. 4.

FIG. 8 shows a third embodiment of the present invention provided with a lubrication device 140 that is another modification of the lubrication device 90 shown in FIGS. 1 to 6. The third embodiment is generally similar to the above-described first embodiment, except for the lubrication device 140. The lubrication device 140 is different from the lubrication device 90 in that it does not include the shaft-end oil output opening 99b through which lubricant oil of the upper end portion 66b of the eccentric shaft 66 is output, but includes a peripheral oil output opening 149c.

Namely, the lubrication device 140 in the third embodiment includes: a first lubricating oil passageway 141 (corresponding to the first lubricating oil passageway 91 of the above-described first embodiment) for supplying lubricating oil to the lower bearing 26 of the crankshaft 12; a gear lubricating oil passageway 147 (corresponding to the gear lubricating oil passageway 97 of the above-described first embodiment) provided at the distal end of the first lubricating oil passageway 141; an ejection section 153 (corresponding to the ejection section 103 of the above-described first embodiment) provided at the distal end of the gear lubricating oil passageway 147 for ejecting lubricating oil toward the meshing engagement section 104 between the timing gear 63 and the eccentric gear 65; a shaft-end lubricating oil passageway 148 (corresponding to the shaft-end lubricating oil passageway 98 of the above-described first embodiment) connected to the gear lubricating oil passageway 147 for supplying lubricating oil to the lower shaft end portion 66c of the eccentric shaft 66; and a shaft lubricating oil passageway 149 (corresponding to the shaft lubricating oil passageway 99 of the above-described first embodiment) extending through the eccentric shaft 66 from the lower shaft end portion 66c to the upper shaft end portion 66b.

The first lubricating oil passageway 141, gear lubricating oil passageway 147, shaft-end lubricating oil passageway 148 and shaft lubricating oil passageway 149 together constitute a lubricating oil passage 151 for supplying lubricating oil in such a manner as to pre-press the lower shaft end portion 66c in a predetermined direction.

The first lubricating oil passageway 141 has a crank-side supply opening 141a for supplying lubricating oil to around the lower shaft end portion 12c of the crankshaft 12.

The shaft-end lubricating oil passageway 148 has an eccentric-side supply opening 148a for supplying lubricating oil to the lower shaft end portion 66c of the eccentric shaft 66. The shaft lubricating oil passageway 149 has an oil input opening 149a through which lubricating oil is input to the lower shaft end portion 66c of the eccentric shaft 66, and the peripheral oil output opening 149c through which lubricating oil is output to around the upper shaft end portion 66b of the eccentric shaft 66.

The third embodiment of the multi-link, adjustable-stroke type engine 10, as explained above in relation to the first embodiment of FIG. 3, includes the timing gear 63 provided concentrically with the crankshaft 12, and the eccentric gear 65 meshing with the timing gear 63 so that rotation of the timing gear 63 is transmitted to the eccentric gear 65. The timing gear 63 and eccentric gear 65 are each a helical gear.

In a case where a maximum downward axial load acts on the crankshaft 12 as indicated by arrow c1 in FIG. 8 and a maximum upward axial load acts on the eccentric shaft 66 as indicated by arrow c2 in FIG. 8, the crankshaft 12 is placed in advance in contact with the cylinder barrel 16, using its own weigh, before the maximum downward axial load acts on the crankshaft 12, but also lubricating oil is supplied to the lower shaft end portion 66c of the eccentric shaft 66 to press the eccentric shaft 66 upwardly.

As seen from FIGS. 1 to 3 and 8 (third embodiment), the multi-link, adjustable-stroke type engine 10 of the present invention includes, in addition to the aforementioned cylinder barrel 16 having the cylinder (cylinder block) 14 for reciprocatively guiding the piston 13 and the crankcase 15 for rotatably supporting the crankshaft 12 whose axis line is oriented in the substantially vertical direction, the cylinder head 17 and oil pan 21, the eccentric shaft (rotation shaft) 66 for adjusting the intake stroke and exhaust stroke of the piston 13.

The cylinder barrel 16 includes the lubricating oil passage 151 for supplying lubricating oil to the lower shaft end portion 66c of the eccentric shaft 66 in such a manner as to pre-press the lower shaft end portion 66c in a predetermined direction. Thus, the crankshaft 12 and/or the eccentric shaft 66 can be placed in advance in contact with the cylinder barrel 16 (gearbox surface) that becomes a collision surface when a maxim axial load occurs. In this way, the third embodiment can minimize hitting sound caused by collision, against the cylinder barrel 16, of the lower shaft end portion 12c of the crankshaft 12 and the upper and lower shaft end portions 66b and 66c of the eccentric shaft 66.

The third embodiment of the multi-link, adjustable-stroke type engine 10, similarly to the second embodiment of FIG. 7, includes the timing gear 63 provided concentrically with the crankshaft 12, and the eccentric gear 65 meshing with the timing gear 63 so that rotation of the timing gear 63 is transmitted to the eccentric gear 65.

In a case where a maximum upward axial load acts on the crankshaft 12 and a maximum downward axial load acts on the eccentric shaft 66, lubricating oil is supplied to the lower shaft end portion 12c of the crankshaft 12 to press the crankshaft 12 upwardly, and appropriate amounts of lubricating oil are supplied to the upper and lower shaft end portions 66b and 66c such that the loads acting on the eccentric shaft 66 are canceled out by the supplied lubricating oil. In this way, it is possible to minimize hitting sound caused by collision, against the cylinder barrel 16, of the lower shaft end portion 12c of the crankshaft 12 and the upper and lower shaft end portions 66b and 66c of the eccentric shaft 66.

Because the eccentric shaft 66 is relatively light in weight, appropriate amounts of lubricating oil are supplied to the upper and lower shaft end portions 66b and 66c to hold the shaft end portions 66b and 66c such that the self weight and load acting on the eccentric shaft 66 are canceled out by the supplied lubricating oil.

In a case where a maximum downward axial load acts on the crankshaft 12 and a maximum upward axial load acts on the eccentric shaft 66 as shown in FIG. 8, the crankshaft 12 is placed in advance in contact with the cylinder barrel 16, using its own weight, before the maximum downward axial load acts on the crankshaft 12, but also lubricating oil is supplied to the lower shaft end portion 66c of the eccentric shaft 66 to press the eccentric shaft 66 upwardly. In this way, it is possible to minimize hitting sound caused by collision, against the cylinder barrel 16, of the lower shaft end portion 12c of the crankshaft 12 and the upper and lower shaft end portions 66b and 66c of the eccentric shaft 66. Namely, because the crankshaft 12 has a considerable weight, the crankshaft 12 is placed in advance in contact with the cylinder barrel 16 before the maximum downward axial load acts on the crankshaft 12.

The various features of the above-described first to third embodiment of FIGS. 1 to 8 provided with the lubrication devices 90, 120 and 140 may be combined as appropriate. For example, in the second embodiment, the crankshaft 12 and/or the eccentric shaft 66 can be placed in advance in contact with the cylinder barrel 16 (gearbox surface) that becomes a collision surface when a maxim axial load occurs. Further, it should be appreciated that the present invention is not limited to the above-described embodiments and may be modified variously without departing from the spirit and scope of the invention defined in the appended claims.

Further, whereas the engine 10 of the present invention has been described as a vertical, multi-link adjustable-stroke type engine, the present invention is not necessarily limited to an engine with the axis line 12a of the crankshaft 12 oriented in a substantially vertical direction.

The multi-link adjustable-stroke type engine of the present invention is well suited for application to cogeneration apparatus where an engine, power generator and exhaust heat exchanger are accommodated in a single housing and where city gas etc. is supplied to the engine for power generation and heat exchange.

What is claimed is:

1. A multi-link, adjustable-stroke type engine including: a cylinder barrel having formed therein a cylinder for reciprocatively guiding a piston, and a crankcase rotatably supporting a crankshaft; a cylinder head closing a cylinder-side opening of the cylinder barrel from a lateral side thereof; an oil pan provided in a lower region of the cylinder barrel; a cam gear shaft provided in the crankcase and having cams for driving an intake valve and an exhaust valve, respectively; and an eccentric shaft provided in the crankcase for changing an intake stroke and compression stroke of the piston, the multi-link, adjustable-stroke type engine comprising:
a timing gear provided on and concentrically with the crankshaft;
an eccentric gear provided on the eccentric shaft and meshing with the timing gear so that rotation of the timing gear is transmitted to the eccentric gear;
a lubricating oil passage provided in the cylinder barrel for supplying lubricating oil to a lower shaft end portion of the crankshaft and a lower shaft end portion of the eccentric shaft; and
an ejection section provided in the lubricating oil passage for ejecting lubricating oil toward a meshing engagement section between the timing gear and the eccentric gear.

2. The multi-link, adjustable-stroke type engine according to claim 1, wherein the cylinder barrel includes an oil pump provided therein adjacent to a lower surface of the cylinder barrel and connected to a lower end portion of the cam gear shaft to be driven by the cam gear shaft, and
the lubricating oil passage is provided in the cylinder barrel adjacent to the lower surface of the cylinder barrel.

3. The multi-link, adjustable-stroke type engine according to claim 1, wherein the ejection section ejects the lubricating oil vertically upwardly toward the meshing engagement section.

* * * * *